United States Patent

Balz

[15] 3,647,038
[45] Mar. 7, 1972

[54] POWER DRIVEN POSITIONING SYSTEM WITH INTERRUPT MEANS UPON APPLICATION OF A POSITIONING FORCE AT END POINTS OF TRAVEL

[72] Inventor: Jurgen Balz, Heilbronn/Neckar, Germany
[73] Assignee: Firma Helmut Balz GmbH, Heilbronn/Neckar, Germany
[22] Filed: July 20, 1970
[21] Appl. No.: 56,608

[30] Foreign Application Priority Data

Mar. 5, 1970 Germany ...................... P 20 10 431.8

[52] U.S. Cl. ........................ 192/141, 192/142 R, 192/150, 200/47, 251/134
[51] Int. Cl. ........................................................F16d 71/00
[58] Field of Search ............... 192/141, 142 R, 150; 251/134; 200/47; 318/468, 469; 74/424.8 VA

[56] References Cited

UNITED STATES PATENTS 2,407,537  9/1946  Chapman........................... 192/150 X
3,150,752  9/1964  Baumann........................... 251/134 X
3,524,526  8/1970  Denkowski........................ 192/150 X

FOREIGN PATENTS OR APPLICATIONS 1,547,154  10/1968  France................................. 251/134

Primary Examiner—Allan D. Hermann
Attorney—Flynn and Frishauf

[57] ABSTRACT

A rotatable positioning member driven, for example by a gear over a motor moves a threaded spindle in an axial direction to position the spindle, for example for placement of a valve. When the threaded spindle, for example with a valve element at the end, reaches a terminal position, the positioning member will travel axially on the threaded spindle. The positioning member is located in a housing and is held in rotatable position by the inner races of an axially movable ball bearing, the outer races of which are held separated and apart by a pair of U-shaped leaf springs. Upon axial excursion of the positioning member, the bearings will be moved axially against the force of the spring, and axial movement transmitted to frictionally engage a camming disk with the rotatable positioning member which, upon rotation, operates an electrical switch to interrupt the power when the force of application of the spindle to the terminal position is matched to the compression force of the U-shaped spring.

7 Claims, 11 Drawing Figures

POWER DRIVEN POSITIONING SYSTEM WITH INTERRUPT MEANS UPON APPLICATION OF A POSITIONING FORCE AT END POINTS OF TRAVEL

The present invention relates to a power driven positioning system in which power is interrupted when a limit, or end position is reached and a predetermined amount of force is transmitted at the end position, and more particularly to such a system which is compact, reliable and permits substantial positioning distance while enabling presetting of the final force by means of springs. The particular use of the present invention is to apply a valve member against a valve seat, with a predetermined force.

Most positioning systems, as known in the art, have a part which is subject to travel, or excursion. When the end of the travelled path is reached, a limit switch is operated to disconnect the drive motive power from the moving part. Applicant's prior U.S. Pat. No. 3,616,884, Nov. 2, 1971, discloses a positioning arrangement in which a rotatable positioning member, for example driving a valve stem, or the like, is held in centered position between a pair of bowed spring disks. The positioning member is driven by a motor, and a threaded spindle, retained against rotation, travels lengthwise of the axis of the rotatable positioning member. Upon reaching the terminal position when the spindle can no longer travel lengthwise of the positioning member, the rotatable positioning member will, itself, move against the force of the spring pressure and travel on the spindle. In so doing, a camming disk located against the surface of the positioning member will be frictionally engaged to turn with the positioning member and an out-of-round portion of the camming disk will engage a switch element to shut off the drive motive power.

The present invention relates to an improvement in such a drive, which is simple to construct, sturdy, and in which the switching forces have a minimal effect on the force being applied to the positioning member by the spring. The aforementioned earlier application discloses the entire mechanism in detail and the disclosure thereof is hereby incorporated by reference.

SUBJECT MATTER OF THE PRESENT INVENTION

Briefly, the rotatable positioning member is held in position by the inner races of a pair of ball bearings which are axially movable. The outer races are held spread apart by U-shaped bowed springs, maintaining the outer races in contact with a surrounding housing. Upon excursion of the positioning member, the inner race of the ball bearing, secured to the positioning member, will move axially, carrying along the outer race which will move against the force of the spring. One of the races of the ball bearings will engage a coupling sleeve slidable against a camming disk located adjacent the positioning member, to press the camming disk against the positioning member for frictional engagement therewith. The camming disk, in a manner similar to that disclosed in the aforementioned application, will effect electrical switching to turn off the drive motor for the positioning member.

The U-shaped springs, in the form of leaf springs provide excellent spring characteristics, they are simple to mount and reliable. By choosing interposed sleeves between the leaf spring and the camming disks which are only slightly shorter than the normal distance, and accurately determining the length of the sleeves, the force with which the final position is determined can be accurately set.

The invention will be described by way of example with reference to the accompanying drawings, wherein:

FIG. 6, in sequential sub

Figure 1:
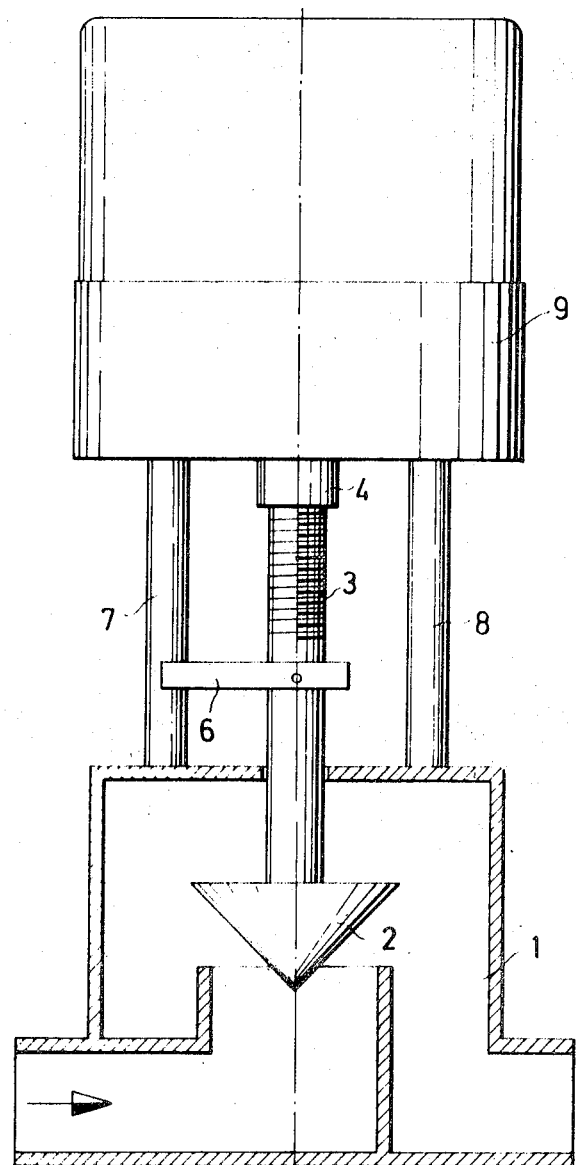
FIG. 1 is a longitudinal axial, partly cross-sectional view of the positioning system applied to a valve.

A valve generally illustrated at 1 has a valve operating member 2 which is vertically movable. Valve operating member 2 is connected to a spindle 3, guided against rotation by means of a forked member 6, one end of which slides on a post 7 which, together with a similar post 8 carries housing 9 of the valve power operating unit forming the positioning system of the present invention. The spindle 3 is axially displaced by means of a rotatable nut 4.

Figure 5:
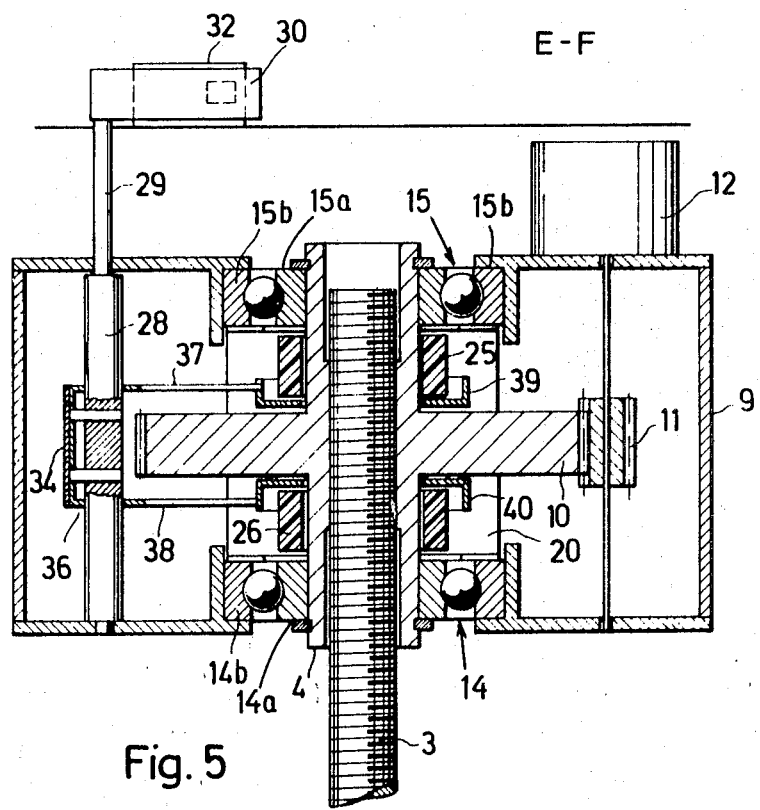
FIG. 5 is an axial longitudinal cross-sectional view, 90° turned with respect to FIG. 2, and along lines E–F of FIG. 4.
Figure 6D:
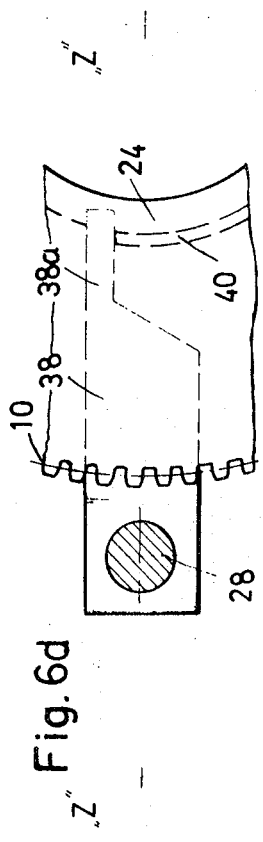
-figures 6a–6f, is a fragmentary top view, to an enlarged scale, illustrating sequential operation of the switching mechanism, in consecutive steps.
Figure 6E:
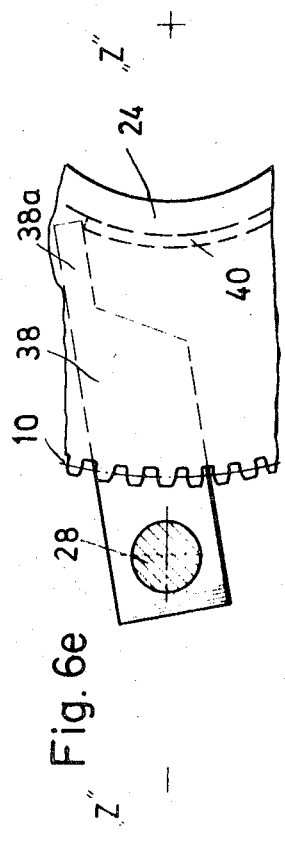
Figure 6F:
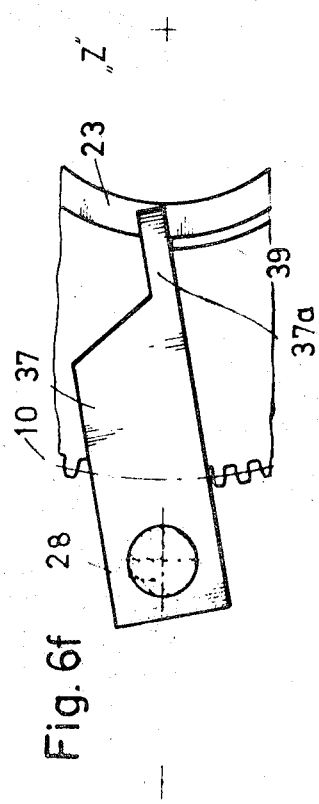
Figure 6A:
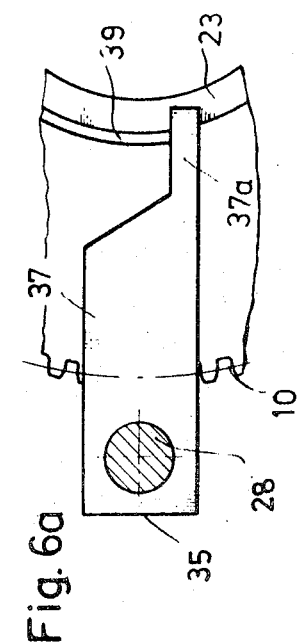
Figure 6B:
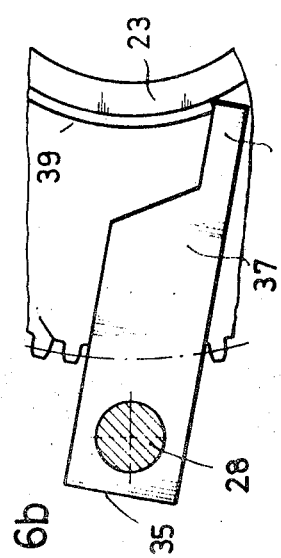
Figure 6C:
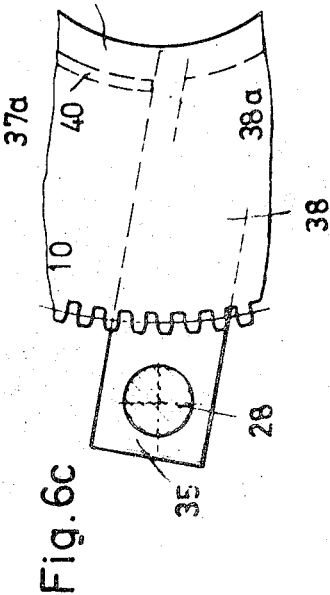

Nut 4 (FIGS. 2, 5) is integral with a positioning gear member 10 (FIG. 5) driven over a pinion 11 by means of a motor 12 located within housing 9 (FIG. 5). If desired, additional gear members can be located between the pinion 11, and positioning gear 10 which, however, have been omitted from the drawings for purposes of clarity. Pinion 11 is axially longer than gear 10 to permit axial excursion of nut 4, and hence of the gear 10 without loss of meshing engagement of the gearteeth.

Figure 2:
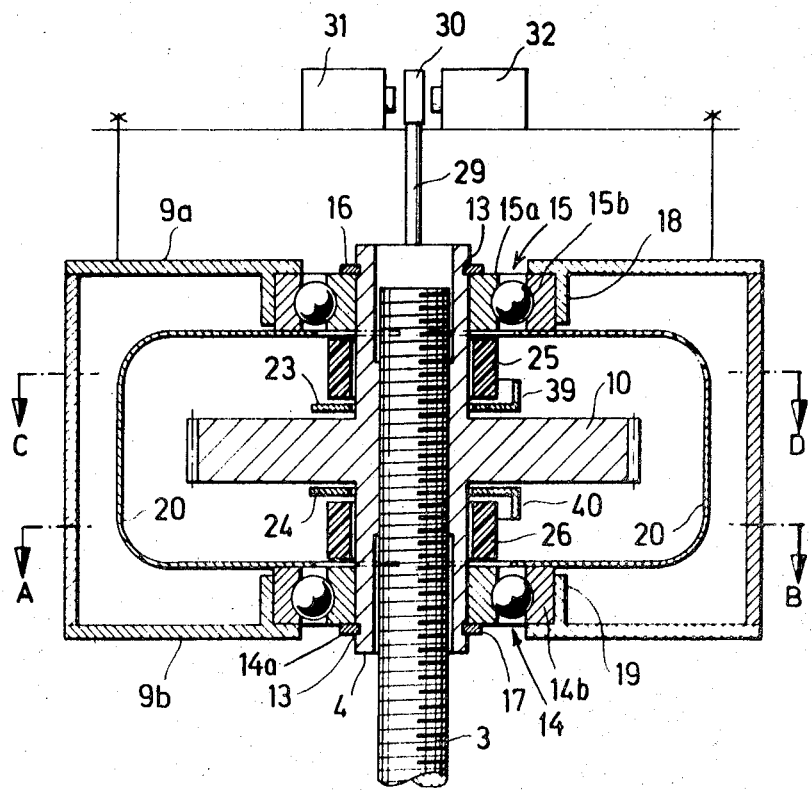
FIG. 2 is an axial sectional view.
Figure 3:
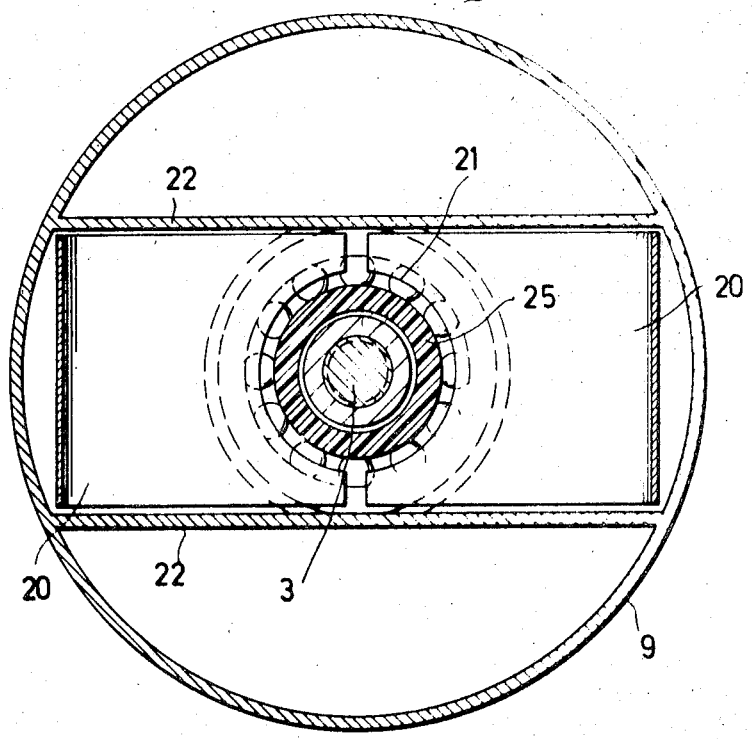
FIG. 3 is a top cross-sectional view along lines A–B of FIG. 2.

FIG. 2 shows that nut 4 has, on both sides of gear 10, axially extending extensions 13 which are secured to the inner races 14a, of 15a ball bearings 14, 15 which, on the one side, is supported by C-rings 16, 17, respectively. Ball bearings 14, 15 have their outer races 14a, 15b located in cylindrical bearing bosses 18, 19, located in opposite transverse walls 9a, 9b, respectively of the housing, to be slidable within the bosses. Ball bearings 14, 15 guide the spindle nut 4. A pair of U-shaped springs 20 are inserted between the outer races of ball bearings 14, 15 (FIGS. 2, 5). As best seen in FIG. 3, the springs have a central notch 21 coaxial with spindle 3. The leaf springs 20 are guided in ribs 22 formed in the housing. They press the bearings 14, 15 against the C-rings 16, 17 with a predetermined biassing force.

The electrical switching element is operated by a pair of camming disks 23, 24 (FIGS. 2, 4) which thus form switch operating means, which are freely rotatable and coaxial with spindle 3. Camming disks 23, 24 operate the terminal switching mechanism. They can be coupled to the spindle nut 4 or, as shown in the drawings, to the positioning gear 10 by frictional engagement therewith. A pair of elastic sleeves 25, 26 are located on either side of camming disks 23, 24 which in turn bear against the inner races 14a, 15a ball bearings 14, 15. Elastic sleeves 25, 26 are preferably of an elastic plastic material. The axial length of plastic sleeves 25, 26 is so selected that it is slightly less than the distance between the disks 23, 24 and the end faces of the ball bearing races to form engagement elements between disks 23, 24 and the respective races, as will appear below.

Operation

When the valve element has reached its terminal position, and the positioning force exceeds the strength of the springs 20, then nut 4, and with it the positioning gear 10 will move in an axial direction, carrying along a bearing 14, or 15, respectively, by means of the C-rings 17, 16, respectively. Thus, the entire bearing can move within the respective bosses 18, 19. Movement of the bearing in axial direction will cause the bearing to engage the adjacent elastic sleeve 25, 26 which, after having been displaced by a predetermined distance, will tend to squeeze the adjacent camming disks 23 or 24, respectively, between the face of the gear 10 and the axially moving elastic sleeve. The previously freely rotatable camming disks 23, 24, respectively, will now be carried along by the drive gear 10, so that it will begin to rotate. Rotation of the camming disk is used to switch off the drive motor at the terminal position.

Figure 4:
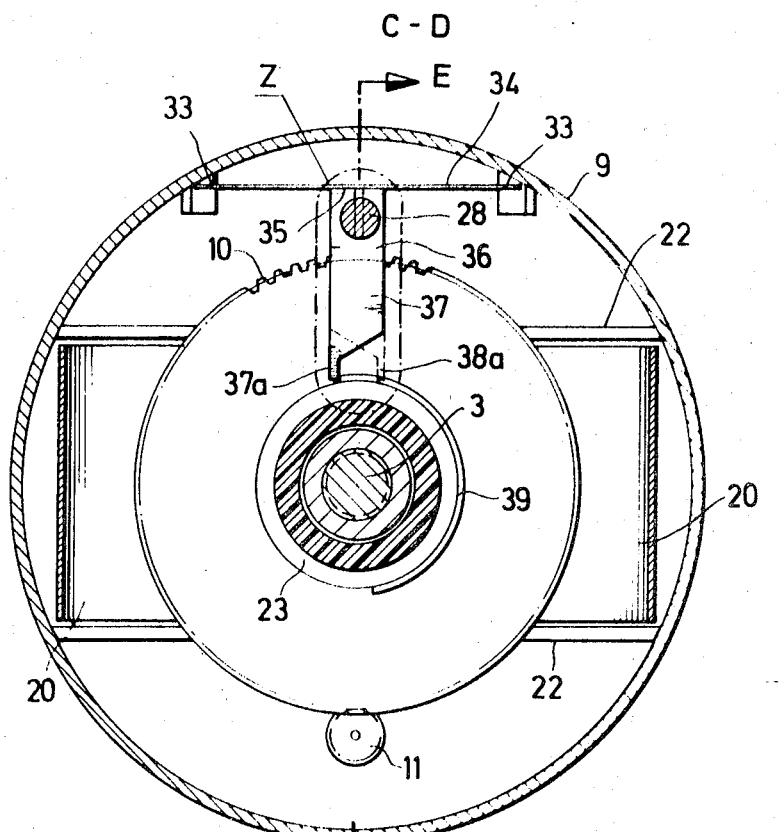
FIG. 4 is a cross-sectional view along lines C–D of FIG. 2.

The switching mechanism is best seen in FIGS. 4 and 5. A shaft 28 is arranged parallel to spindle 3 and rotatable in the housing. Shaft 28 extends above the upper housing wall 9a at 29. It is connected with an operating arm 30 which, upon twist of shaft 28, operates one or the other of a pair of microswitches 31, 32 (FIG. 2). Shaft 28 (FIG. 4) is held in centered position by means of a spring 34, engaging a flat surface 35 of an operating lever 36 connected to shaft 28 and secured against rotation with respect thereto. Spring 34 is held at two end positions in housing 9 in any well known manner, as seen, for example, in FIG. 4. The operating lever 36 is U-shaped (FIG. 5) and is formed with a pair of arms 37, 38 extending on either side of the positioning gear 10. The arms 37, 38 are shaped in the forms best seen in FIG. 6, and each has at its extending end an operating finger 37a, 38a, which can engage with a cam 39, 40, respectively, of the camming disks 23, 24, respectively. As seen in FIG. 4, cams 39, 40 extend about 180°.

Operation of switch-off mechanism: Upon excursion of nut 4, due to excess positioning force over the biassing force of springs 20, a respective camming disk 23 or 24 is connected to be frictionally engaged with positioning gear 10 (as previously described). Upon such frictional engagement, the one or the other of the cams 39, or 40 of the associated camming arm 37, 38 will be deflected, as seen in FIG. 6, so that shaft 28 is likewise turned to operate over arm 30 the one or the other of the microswitches 31, 32. The camming disks 23, 24 are uncoupled from gear 10, and thus from nut 4, until the gear 10 has been subjected to axial excursion. Due to grease, or other matter adhering to the gears, it can happen that spring 35 cannot hold the operating arm in centered position against forces possible acting on the camming disks tending to carry the camming disk along with the positioning gear 10. It could even happen that one of the camming disks, not coupled to the gear 10 stops in such a position that the cam has moved over a longer rotatable path than necessary to operate the lever 36. Upon reverse operation of the motor, it could happen that the camming lever 36, and with it shaft 28 cannot return at all to its centered position since it will be held in deflected position by the respective camming disk, although it is not coupled thereto. To prevent such undesired operation, the two camming arms 37, 38 are provided with fingers 37a, 38a located at the outer portion of the camming arms 37, 38. Referring to the sequential views of FIG. 6: Upon operation of the operating lever 37 by means of camming disks 23 from the position of FIG. (a) of FIG. 6 into the position of FIG. (b) of FIG. 6, then the uncoupled, lower camming disk 24 cannot engage between the camming arm 38, as seen in FIG. 6 (c) since cam 40 will be prevented from entering therebeneath by means of finger 38a. A similar result will be obtained with respect to cam 39 upon operation of camming disk 24, tending to operate the lower part of the camming lever, namely part 38, and as best seen in the sequence of FIGS. (d) – (f) where the relationship is shown for the reverse direction of rotation.

Disks 23, 24 have a small diameter with respect to the diameter of positioning gear 10 so that the switching forces acting on the cams 39, 40 will have only low torque and reaction of the switching forces on rotation of the positioning member, and hence on the positioning force is practically eliminated.

The operation of the present invention has been illustrated and described in connection with a valve, but it may be applied to any kind of apparatus. Minor constructional details of parts well known in the art, such as spacer members, sealing members, or guide element not necessary to an understanding of the inventive concept have been omitted from the drawing and from the description for purposes of clarity.

I claim:

1. Power driven positioning system with power interrupt means upon application of a predetermined positioning force at terminal points of the drive comprising
   a housing (9);
   a threaded, nonrotatable spindle (3) extending through said housing;
   power drive means (11, 12);
   a rotatable positioning member (4, 10) rotatable about said spindle and driven by engagement with said power drive means and moving said spindle axially upon rotation of said positioning member by said power drive means, said positioning member having a pair of end faces;
   a pair of switch operating means (23, 24), one each located adjacent a face of said positioning member and frictionally engageable with a face thereof to be rotatable thereby upon such engagement;
   a pair of axially movable bearings (14, 15, 17, 16) rotatably securing said positioning member and permitting axial movement thereof and having a portion secured to the positioning member and a nonrotatable portion slidable in the housing;
   a pair of axially movable engagement means (25, 26) located opposite the respective switch operating means and respective portions of the bearing secured to said positioning member and slightly spaced axially from the switch operating means;
   and a U-shaped spring having the bend of the U surrounding the positioning member (4, 10) and its legs extend towards its spindle resiliently engaging against the fixed portions of the bearings to hold said bearings and hence said engagement means spaced from said switch operating means,
   whereby, when the axial force on said spindle exceeds the compression spring force of the legs of the U-shaped spring towards each other, the rotatable positioning member will carry the bearing portion along and move axially, effecting frictional engagement of the switch operating means with an adjacent face of the positioning member to effect rotation thereof and cause interruption of power.

2. System according to claim 1, wherein the bearing is a ball bearing having its outer race located in the housing;
   and the leaf spring (20) engages the outer, nonrotating race of the ball bearing.

3. System according to claim 1, wherein a pair of leaf springs (20) is provided, one each located diametrically opposite the other with respect to the positioning member.

4. System according to claim 3, wherein the legs of the leaf springs (20) have a central notch at the terminal ends to provide for clearance of the leaf springs with respect to the engagement means.

5. System according to claim 3, wherein the housing (9) is formed with transversely extending ribs (22), said leaf springs being held in said housing by said ribs.

6. System according to claim 1, wherein the positioning member is disk-shaped having a pair of flat end faces;
   and said switch operating means are a pair of disks concentric with said positioning member of diameters much less than the diameter of the disk shaped positioning member.

7. System according to claim 1, wherein the housing (9) is formed with internally projecting ribs (22);
   and said leaf spring is held in the housing by said ribs.

* * * * *